June 5, 1923.

V. BOULIA

MILK BOTTLE CARRIER

Filed Feb. 14, 1922

1,457,342

Inventor

V. Boulia

By D. Swift his Attorney

Patented June 5, 1923.

1,457,342

UNITED STATES PATENT OFFICE.

VICTOR BOULIA, OF ORWELL, VERMONT.

MILK-BOTTLE CARRIER.

Application filed February 14, 1922. Serial No. 536,430.

*To all whom it may concern:*

Be it known that I, VICTOR BOULIA, a citizen of the United States, residing at Orwell, in the county of Addison, State of Vermont, have invented a new and useful Milk-Bottle Carrier; and I do hereby declare the following to be a full, clear, and exact description of the invention, such as will enable others skilled in the art to which it appertains to make and use the same.

The invention relates to milk bottle carriers and has for its object to provide a device of this character which is simple in construction and comprising a segmentally shaped spring member formed from wire and adapted to engage the neck of the milk bottle adjacent the flange thereof, and provided with a handle member whereby the bottle may be carried in the holder.

A further object is to form the segmentally shaped body member with loops formed by bending the wire, which loops receive the arms of the handle member which arms are also formed from spring material. Also to provide the segmentally shaped members with diverging arms, which arms when the holder is being placed in position on the milk bottle engage the neck of the milk bottle in such a manner that when the bottle is being forced between the arms the segmentally shaped neck engaging member will be spread, and the neck received in the segmentally shaped member.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
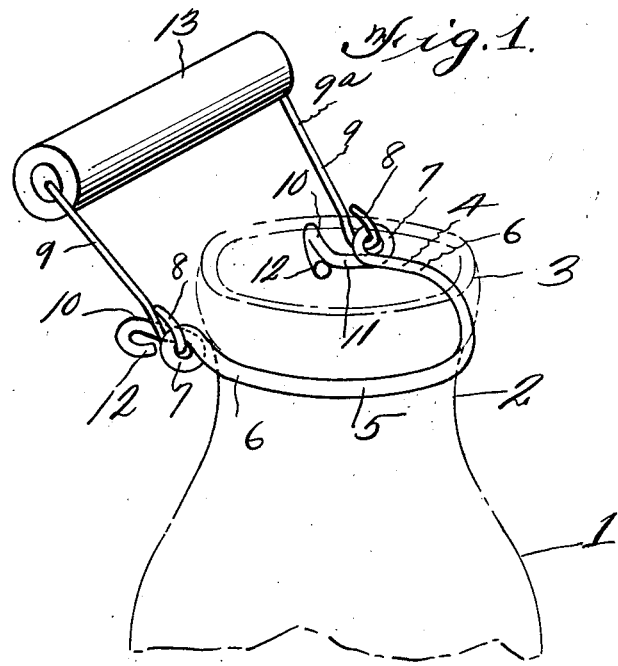
Figure 1 is a perspective view of the bottle holding device showing the same in position on the neck of the bottle.
Figure 2:
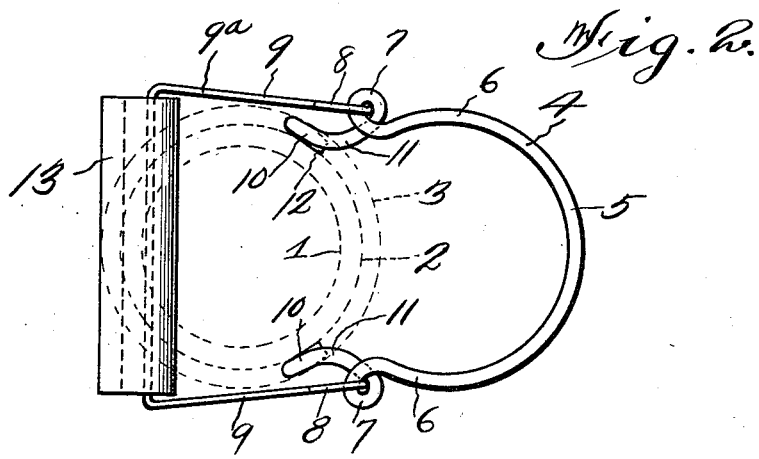
Figure 2 is a top plan view of the bottle holding device, showing the same in position to be forced on the neck of the bottle.

Referring to the drawing, the numeral 1 designates a conventional form of milk bottle, and 2 the neck thereof. The upper end of the neck 2 is provided with the usual flange 3. The milk bottle holder 4 comprises a segmentally shaped neck receiving member 5 formed from heavy spring wire, which member is larger than a half circle. The arms 6 of the member 5 are bent to form eyes 7, which receive the eyes 8 of the spring arms 9 of the handle bail 9ª. By providing the spring arms 9, it will be seen that when the ends 6 of the member 5 are forced apart the arms 9 will not interfere with the outward movement of the arms 6 of the member 5, thereby allowing the neck 2 of the bottle to be forced inwardly into position within the segmentally shaped member 5. To facilitate the passage of the neck 2 into position, diverging arms 10 are provided, which arms are formed by bending the wire at points outside of the eyes 7 inwardly and outwardly at 11, and then downwardly forming the arms 12. The arms 10 engage the neck 2 of the bottle as shown in Figure 2, and as the neck 2 is forced into the segmentally shaped spring member 5, the arms 6 thereof are forced apart, thereby allowing the neck 2 to pass into the segmentally shaped member 5 and be held therein by the clamping action of the member 5 and by the engagement of the neck flange 3 with the upper side of the member 5. The bail 9ª is provided with a grip 13 adapted to be grasped by the operator when carrying the bottle in the holder.

From the above it will be seen that a bottle holder and carrier is provided, which is simple in construction, the parts reduced to a minimum and the bottle engaging member 5, the eyes 7 and the guide arms 10 are formed from a single piece of material.

The invention having been set forth what is claimed as new and useful is:—

A bottle carrying device comprising a segmentally shaped neck receiving member formed from spring material, the ends of said segmentally shaped member being bent to form eyes, a bail pivotally connected to said eyes, the ends of the members beyond the eyes being bent inwardly and diverging outwardly, then downwardly and inclining inwardly toward each other beneath the diverging portions thereby forming stiff relatively large bottle neck engaging members between which the bottle neck may be easily forced to its position within the segmentally shaped member.

In testimony whereof I have signed my name to this specification in the presence of two subscribing witnesses.

VICTOR BOULIA.

Witnesses:
 GUY M. COOKE,
 J. C. THOMAS.